May 9, 1944.  S. R. BEITLER  2,348,593
APPARATUS FOR COMPENSATING GAS METER READINGS
Filed June 25, 1942
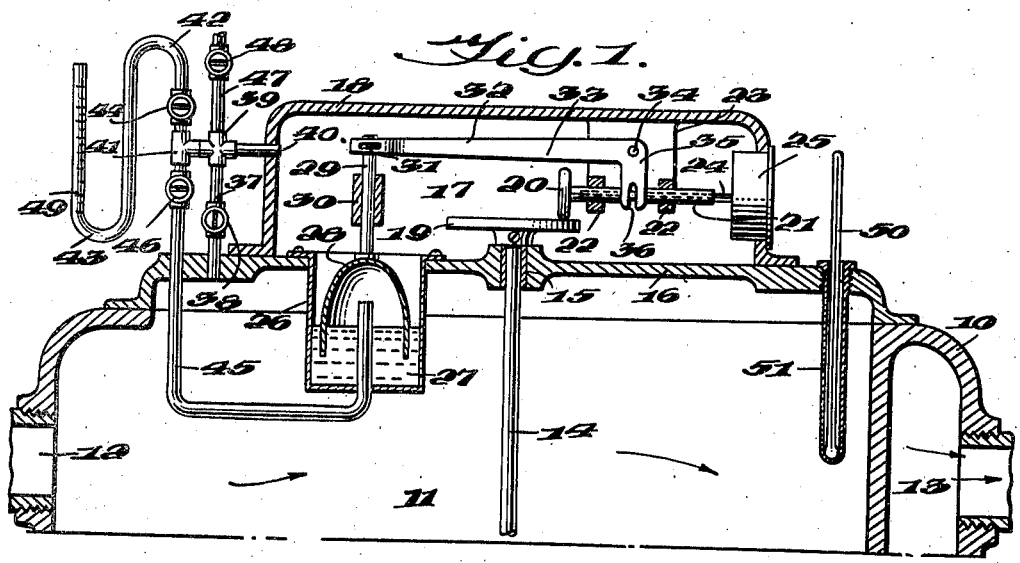
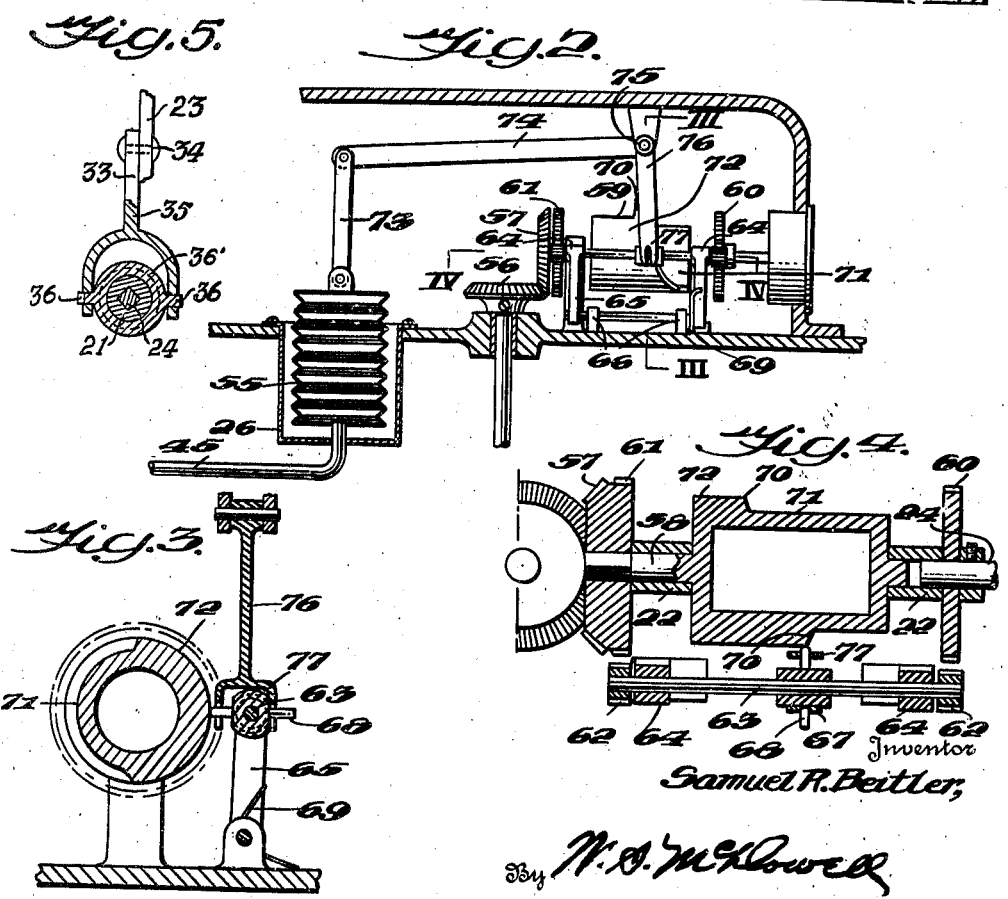
Inventor
Samuel R. Beitler,
By W. A. McDowell
Attorney Patented May 9, 1944

2,348,593

UNITED STATES PATENT OFFICE 2,348,593

APPARATUS FOR COMPENSATING GAS METER READINGS

Samuel R. Beitler, Columbus, Ohio, assignor of one-half to John E. Overbeck, Columbus, Ohio Application June 25, 1942, Serial No. 448,451

2 Claims. (Cl. 73—233)

This invention relates to an improved apparatus for compensating gas meter readings for the effect of elasticity to reduce the measured volumes to basic conditions.

Displacement types of fluid meters, when used for the measurement of compressible fluids, generally measure the volume of the fluid at the pressures and temperatures existing in such meters; that is, the quantity of fluid passed through a meter is the cubical displacement at flowing conditions. For ordinary small meters used for measuring compressible fluids, such as domestic type gas meters, the difference between the volume at existing conditions and at some basic condition of pressure and temperature is usually ignored. In large volume or high pressure measurements where the pressure is much different from the basic pressure, it is customary to determine the absolute metering pressure by adding an assumed normal barometer reading (occasionally actual barometric pressure is used) to the volume weighted average recorded gauge pressure. This absolute pressure is used for computing a factor (or pressure multiplier) with which to multiply the volume indicated by the meter readings at the existing conditions to convert them into volume at the basic pressure. This factor is usually calculated by assuming that the measured fluid is a perfect gas following Boyle's law, which is to the effect that if the temperature of a gas is held constant, then its volume varies inversely as the absolute pressure.

In some cases, the meter readings are also adjusted for the difference between the metering temperature and a given basic temperature. This adjustment is usually made by installing a recording thermometer to record the temperature of the flowing gas passing through a meter, and this temperature is used for computing a factor (or temperature multiplier) with which to multiply the volume indicated by the meter at existing conditions to convert the same into volume at basic temperature. This factor is computed by assuming that the fluid will follow Charles' law which states that if the pressure is constant, then the volume of a perfect gas is directly proportional to its absolute temperature. Since very few fluids follow faithfully Boyle's and Charles' laws, it also is necessary for accurate measurements to use a factor to take into account the deviations from these laws if the true volume at the basic conditions is to be determined.

Velocity types of fluid meters, such as orifice meters, nozzle meters, or Venturi meters, measuring elastic fluids, also, must have their flows computed using factors of a similar nature to compensate for deviations from the basic pressures and temperatures, as well as the deviations of the gas from the perfect gas laws. With the velocity type meter, it is also necessary to take into account any change in the specific gravity of the measured fluid. Such calculations require considerable time and and experience and are, of course, subject to error.

It is, therefore, one of the objects of this invention to provide simple mechanical means which will compensate automatically for the variations in gauge pressure, barometric pressure, temperature and deviation from the gas laws, so that a displacement meter is provided which will enable one to read directly the volume of fluid measured under such basic conditions.

For a further understanding of the invention, reference is to be had to the following description and the accompanying drawing, wherein:

Fig. 1 is a vertical sectional view taken through the upper part of the casing of a displacement type meter and disclosing in association therewith the compensating apparatus forming the present invention;

Fig. 2 is a similar view disclosing a modified form of the compensating apparatus;

Fig. 3 is a vertical transverse sectional view taken on the plane indicated by the line III—III of Fig. 2;

Fig. 4 is a detail horizontal sectional view on the line IV—IV of Fig. 2;

Fig. 5 is a detail sectional view showing the throw collar of the variable speed motion-transmitting means.

Referring to Fig. 1 of the drawing, the numeral 10 designates the casing of a conventional displacement type of gas flow registering meter. The casing includes a main chamber 11, a gas inlet 12 at one side and a gas outlet 13 at the other side. Within the main chamber 11, there is journaled for rotation a shaft 14, which is adapted to be rotated in accordance with the volumetric flow of gas through the meter. It will be understood that the ordinary displacement apparatus, such as pulsating diaphragms or the like, not shown, is used in rotating said shaft.

The upper end of the shaft is journaled as at 15 in the top wall 16 of the casing 10, the upper end of said shaft projecting into an auxiliary chamber 17, which is formed in an auxiliary casing 18 mounted on the top wall 16, the chambers 11 and 17 being separated by the wall 16.

Secured to the upper end of the shaft 14 for rotation in a horizontal plane is a friction disk 19. Adapted to engage with the upper surface of the disk 19 and adjustable radially thereof is a friction wheel 20. This wheel is carried by one end of a sleeve 21 which is journaled for rotation in a horizontal plane by being supported in bearings 22 provided by a bracket 23, the latter being carried by or forming a part of the auxiliary casing 18. The sleeve 21 is provided with a longitudinally extending bore, substantially square or polygonal in cross section, and which receives the correspondingly formed operating shaft 24 of a counter index 25. It will be seen that by adjusting the positions of the wheel 20 radially with respect to the upper surface of the disk 19, different driving ratios may be readily obtained between the meter shaft 14 and the index shaft 24.

To obtain such adjustment automatically in accordance with variations in temperature and pressure of the gas flowing through the meter, and in order that the index 25 may be read in terms of basic conditions of gas measurement, the top wall 16 is provided with an opening in which is positioned an open-topped well-forming member 26. This member extends into the main chamber 11 of the casing in order to be in heat exchanging relationship with the gases passing through the meter.

The well is adapted to contain a body of a liquid-like medium, as at 27, and buoyantly supported within this body of liquid is a floating bell 28. Arising from the bell is a vertically disposed stem 29, which may be retained in a guide 30. The upper end of the stem 29 is provided with a laterally disposed pin 31, the projecting ends of which are receivable within elongated slots provided in the outer end of the longer arm 32 of a bell crank lever 33. This lever is pivoted as at 34 in connection with the bracket 23, and the shorter arm 35 of said lever has its lower end bifurcated to receive the ends of transversely extending pins 36, which project from a throw collar 36' arranged in an annular groove formed in the sleeve 21. It will be evident that as the bell 28 moves upwardly or downwardly, in response to conditions to be hereinafter described, corresponding motion will be imparted to the stem 29, the bell crank lever 33 and the sleeve 21, causing the wheel 20 to be moved back and forth in a radial direction on the upper surface of the friction disk 19, and thereby automatically varying the driving ratios between the meter and index shafts.

Arising from the top wall of the meter casing is a pipe 37 which communicates at its lower end with the gas flow chamber 11. This pipe includes in the length thereof a manually actuated control valve 38. The upper end of the pipe 37 is joined with a cross fitting 39, from one branch of which extends a short pipe 40 which leads into the auxiliary chamber 17, so that when the valve 38 is open, the gas undergoing measurement will pass from the main chamber 11 into the auxiliary chamber 17.

Joined with the cross fitting 39 is a T-fitting 41. From the top of the fitting 41, there extends a pipe 42, which constitutes a part of a U-shaped gauge tube 43, the pipe 42 being provided with a control valve 44. Also, leading from the bottom of the fitting 41 is a pipe 45 in which is positioned a control valve 46. The pipe 45 extends into the chamber 11 and thence upwardly through the bottom of the well member 26 and the body of liquid 27 into the interior of the floating bell 28, providing for the introduction of gas into the interior of the bell. From the top of the fitting 39, a draw-off pipe 47 having a valve 48 leads to the atmosphere.

Operation

By reason of its location, the liquid container or well member 26 is so placed within the meter that during operation of the latter, the walls of the container or well member will be at substantially the same temperature as the flowing gas. The under side of the bell 28 is charged with a sample of the gas to be measured. When the pressure and temperature of this sample are the same as the basic pressure and temperature, the displacement meter reading may be said to have a pressure and temperature multiplier equal to 1.000.

The under side of the bell is charged with a sample of the flowing gas from the meter through valve 38, having valve 48 closed and valves 44 and 46 open. The gauge pressure will be shown on gauge column 49 of the gauge tube 43, and this pressure is added to the true barometric pressure (read from a barometer) to obtain the true absolute pressure needed. This pressure will vary slightly from time to time and can be computed from the temperature of the gas in the meter, which temperature can be read from the thermometer 50, removably positioned in a well tube 51, extending into the main chamber 11. Since the pipe 40 connects the main chamber 11 with the auxiliary chamber 17, producing a pressure on the top or outside of the bell, the pressures on the inside and outside of said bell will be the same during this charging operation, causing the liquid seal 27 to maintain the same elevation on both the inside and outside of the bell.

After the under side of the bell is so charged, valves 44, 46 and 48 are tightly closed and valve 38 is opened, so that the pressure in the auxiliary chamber 17 will be the same as the pressure in the meter casing 10 during normal operation. As the pressure is increased in the auxiliary chamber 17 (this pressure will be the same as the flowing gas in the chamber 11), the gas underneath the bell 28 will be compressed to the same extent and this gas will also be at the same temperature as the flowing gas in the chamber 11. As the volume of the fluid underneath the bell changes, the latter will fall or rise depending upon the density or elasticity of the bell-confined gas. It is through this motion of the bell, or an equivalent compensator, that the drive to the counter index may be varied to provide for its direct reading under basic conditions, eliminating the necessity for previously employed calculations or ignoring the effect of pressure and/or temperature, the index being read directly in volume of gas at basic conditions.

The apparatus is subject to considerable mechanical variation without departing from its fundamental operating features. Such a variation has been illustrated in Figs. 2 to 4, inclusive, wherein, instead of employing a bell type of float, use is made of a compensator in the form of a bellows element 55. This element is mounted in the container or well member 26 so that it is responsive to the temperature of the gases passing through the meter. The interior of the bellows element communicates with the gas delivering pipe 45 in the same manner as does the interior of the bell 28.

In this form of the invention, in lieu of a friction type of change-speed gearing, cam-actuated toothed gearing may be used to provide a more positive drive. Thus the upper end of the meter shaft 14 is provided with a beveled gear 56, which meshes with a corresponding gear 57 which is fixed to rotate with the journal shaft 58 of a cylindrical cam 59, the shaft extremities of said cam being supported for rotation in the bearings 22. The operating shaft 24 of the counter index rotates independently of the cam 59, and carries a spur gear 60. A spur gear 61 rotates in unison with the gear 57 and may be formed as an integral part thereof, as in Fig. 4.

Adapted to simultaneously engage and disengage the gears 60 and 61 are spur pinions 62 which are mounted upon the ends of a countershaft 63. This countershaft is supported in bearings 64 formed in connection with a frame 65, the latter being pivoted as at 66 for swinging movement about a horizontal axis. Slidably mounted on the countershaft between the bearing 64 is a collar 67, from which project laterally directed pins 68.

The inner of these pins is maintained in constant contact with the peripheral surfaces of the cam 59, such contact being positively maintained by the spring 69 which acts on the frame 65, normally tending to swing the latter inwardly toward the cam. Said cam has a spiral leading edge 70 which divides the cam into an inner cylindrical part 71 and an outer or raised cylindrical part 72. When the inner pin 68 is in contact with the inner part 71 of the cam, the frame 65 is rocked sufficiently to bring the pinions 62 into meshing engagement with the teeth of the spur gears 60 and 61, thereby transmitting motion from the meter shaft 14 to the index shaft 24. However, when the said pin is in engagement with the raised portion 72 of the cam, the frame 65 is rocked against the resistance of the spring 69 so that the pinions 62, as shown in Fig. 4, occupy positions spaced from the teeth of the gears 60 and 61, thereby interrupting the drive to the index shaft. The duration of this period of measurement depends upon the particular position which the collar 67 occupies with respect to the length of the cam 59.

As the collar is moved toward the right, as viewed in Fig. 2, a greater period of gear driving engagement obtains, and this period for each complete rotation of the cam progressively decreases as the collar is shifted toward the left.

The movement of the collar 67 is automatically effected by providing the bellows element with an upstanding pivoted link 73, the upper end of this link being pivotally connected with the longer arm of the bell crank lever 74. This lever is pivoted as at 75 and is provided with a shorter arm 76, the lower end of said arm being formed with a bifurcated yoke 77, which is slotted for engagement with the pin 68. As the bellows element expands or contracts in accordance with the operating conditions of the gases flowing through the meter, the collar 67 is accordingly shifted on the shaft 63 and the driving ratios between the meter and index shafts correspondingly varied. It will be appreciated that other variable speed drives and compensators may be substituted for those herein specifically disclosed for illustrative purposes.

I claim:

1. Gas flow measuring apparatus comprising a meter casing having a main chamber through which gas undergoing measurement is adapted to be passed, an auxiliary casing mounted on said meter having a chamber spaced by an intervening wall from said main chamber, a container provided in said wall, said container having heat-conducting walls positioned in said main chamber so as to be maintained at the temperature of the gas passing through the latter, said container having received therein a body of liquid, a bell-type float buoyantly supported on said body of liquid to provide an internal chamber, means communicating with the chamber of said auxiliary casing for introducing a gas sample under predetermined conditions of temperature and pressure into the internal chamber of said float and to maintain the sample under such conditions when unaffected by varying extraneous conditions, a valved passage establishing gas flow communication between the main chamber of said meter and the interior of said auxiliary casing so that the gaseous atmosphere surrounding the exterior of said float substantially corresponds in temperature and pressure to the gases passing through said meter, an element positively rotated by the passage of gas through said main chamber, a counter index, variable speed motion-transmitting means driven by said element for operating said index, and means actuated by the movement of said float in response to internal and external gas pressure and temperature variations for regulating the driving ratios of said motion-transmitting means, whereby to cause said counter index to register for direct reading of gas flow through said meter in terms of basic conditions.

2. Gas flow measuring apparatus comprising a meter casing having a main chamber through which gas undergoing measurement is adapted to be passed, an auxiliary casing provided on said meter having a chamber spaced by an intervening wall from said main chamber, a container provided in said intervening wall, said container being composed of heat-conducting walls disposed in said main chamber so as to be maintained at the temperature of the gas passing through the latter, a movable compensator mounted in said container and formed with an internal chamber, means communicating with the chamber of said auxiliary casing for introducing a gas under predetermined conditions of pressure and temperature into the internal chamber of said compensator and to maintain the same under such conditions when uneffected by varying extraneous conditions, a valved passage establishing gas flow communication between the main chamber of said meter and the interior of said auxiliary casing so that the gaseous atmosphere surrounding the exterior of said compensator substantially corresponds in temperature and pressure to the gases passing through said meter, an element positively rotated by the passage of gas through said main chamber, a counter index, variable speed motion-transmitting means driven by said element for operating said index, and means actuated by the movement of said compensator in response to internal and external gas pressure and temperature variations for regulating the driving ratios of said motion-transmitting means, whereby to cause said counter index to register for direct reading of gas flow through said meter in terms of basic conditions.

SAMUEL R. BEITLER.